United States Patent [19]

Wüchner

[11] 3,974,562
[45] Aug. 17, 1976

[54] PIPE CUTTING DEVICE

[75] Inventor: Xaver Wüchner, Jestetten, Germany

[73] Assignee: Georg Fischer Aktiengesellschaft, Schaffhausen, Switzerland

[22] Filed: Feb. 28, 1975

[21] Appl. No.: 554,107

[30] Foreign Application Priority Data

Mar. 7, 1974 Switzerland.......................... 3244/74

[52] U.S. Cl. ................................................. 30/97
[51] Int. Cl.$^2$ ................. B23D 21/06; B26B 27/00; B26D 3/16
[58] Field of Search................................. 30/97, 96

[56] References Cited
UNITED STATES PATENTS

| | | | |
|---|---|---|---|
| 1,029,265 | 6/1912 | Borden | 30/97 |
| 1,932,462 | 10/1933 | Howlett | 30/97 |
| 2,373,472 | 4/1945 | Haumiller | 30/97 X |
| 2,561,484 | 7/1951 | Shaw et al. | 30/97 X |
| 2,672,682 | 3/1954 | Studebaker et al. | 30/97 |
| 2,692,021 | 10/1954 | Nygren | 30/97 UX |
| 3,088,352 | 5/1963 | Tanner | 30/97 X |
| 3,168,002 | 2/1965 | Walling | 30/97 X |

FOREIGN PATENTS OR APPLICATIONS

| | | | |
|---|---|---|---|
| 758,075 | 9/1956 | United Kingdom | 30/97 |

Primary Examiner—Al Lawrence Smith
Assistant Examiner—J. T. Zatarga
Attorney, Agent, or Firm—Toren, McGeady and Stanger

[57] ABSTRACT

In a pipe cutting device, a stationary chuck for holding a workpiece is connected to a bearing housing, the chuck and bearing housing are in axial alignment. A ring is concentrically mounted within the bearing housing and a cutting support is eccentrically pivotally mounted in the ring and carries a cutting member. The cutting support can be pivoted between a rest position with the cutting member spaced from the workpiece to a cutting position with the cutting member in contact with the workpiece. From the cutting position, the cutting support engages and drives the ring so that both the cutting support and ring move along a concentric path about the workpiece for effecting the cutting operation.

9 Claims, 7 Drawing Figures

PIPE CUTTING DEVICE

SUMMARY OF THE INVENTION

The present invention is directed to a pipe cutting device and, more particularly, it concerns the arrangement of an eccentrically mounted cutting support positioned within and movable along with a concentrically mounted ring for cutting workpieces of various diameters.

In the present invention, the pipe cutting device consists of a stationary workpiece chuck and a bearing housing in axial alignment with the chuck. A guide ring is concentrically mounted within the bearing housing and cutting support is eccentrically mounted within the guide ring and carries a disk-shaped motor-driven cutting tool. The cutting support can be pivoted within the guide ring between a rest position from the workpiece into a cutting position in contact with the workpiece.

A pipe cutter is disclosed in German patent No. 1,171,241 in which a cutting support is designed as a slide and carries a circular saw blade driven by a motor flanged on the slide. The slide is displaceably guided in a rotor mounted in a bearing housing and can be adjusted radially of the workpiece by means of an adjusting spindle axially guided in the rotor. The adjusting spindle includes a collar in contact with a sliding piece bearing on a circular fixed lead cam. A depression is formed in the circumferential surface of the lead cam arranged diametrically to the saw blade and the depth of the depression corresponds to the penetration of the blade into the workpiece during the cutting process.

When making a changeover for a workpiece having a different diameter, the slide is moved into the corresponding cutting position by operating the adjusting spindle, which operation is considered to be very time-consuming, especially if there are large diametrical differences in the pipes being cut. Further, the rather great distance between the clamping point and the saw blade has an adverse effect on the cutting process particularly for pipes with a low intrinsic rigidity. Further, relatively short pipe sections cannot be cut.

Accordingly, the present invention is directed to the problem of providing a pipe or workpiece cutting device with the cutting tool or member positioned immediately adjacent to the chuck holding the workpiece so that it can be positively moved, after each cutting operation, into a starting position corresponding to the maximum diameter of the workpiece being cut. Furthermore, with the present invention it is possible to provide a cutting unit which is detachably connected to the workpiece chuck by simple fastening means.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matters in which there is illustrated and described a preferred embodiment of the invention.

DETAILED DESCRIPTION OF THE INVENTION

Figure 1:
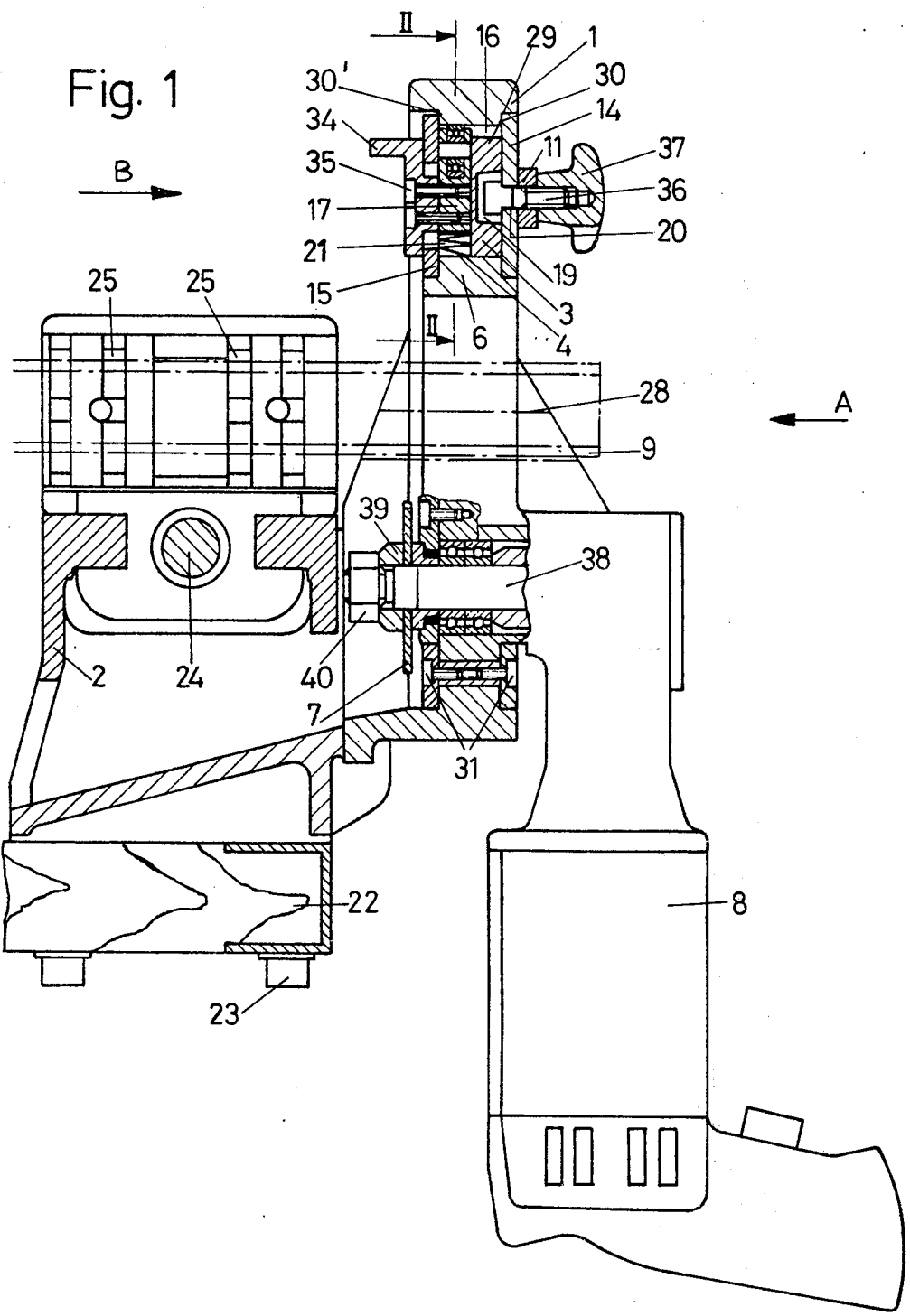
FIG. 1 is a side view, partially in section, of a cutting device taken along the lines I—I in FIG. 2.

The pipe cutting device shown in the drawing has a two-part housing consisting of a bearing housing 1 and a chuck housing 2. Moreover, it is possible to construct the housing as a one-part member.

Figure 6:
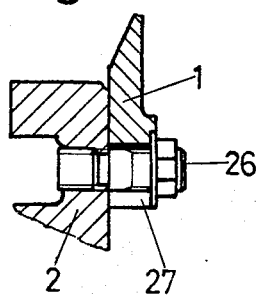
FIG. 6 is a partial sectional view taken along the line III—III in FIG. 2.

The bearing housing 1 is detachably connected to the chuck housing 2 by means of screws 26, for instance setscrews. For a rapid connection of the two housings, the bearing housing 1 has recesses 27 into which the screws 26 are introduced, see FIG. 6.

As can be seen in FIG. 1, the chuck housing 2 is secured to a worktable 22 by screws 23 and chuck jaws 25 are displaceable by means of a threaded spindle 24, as is conventional in pipe vises in which coaxial clamping of a pipe 9 to the cut is used.

Figure 2:
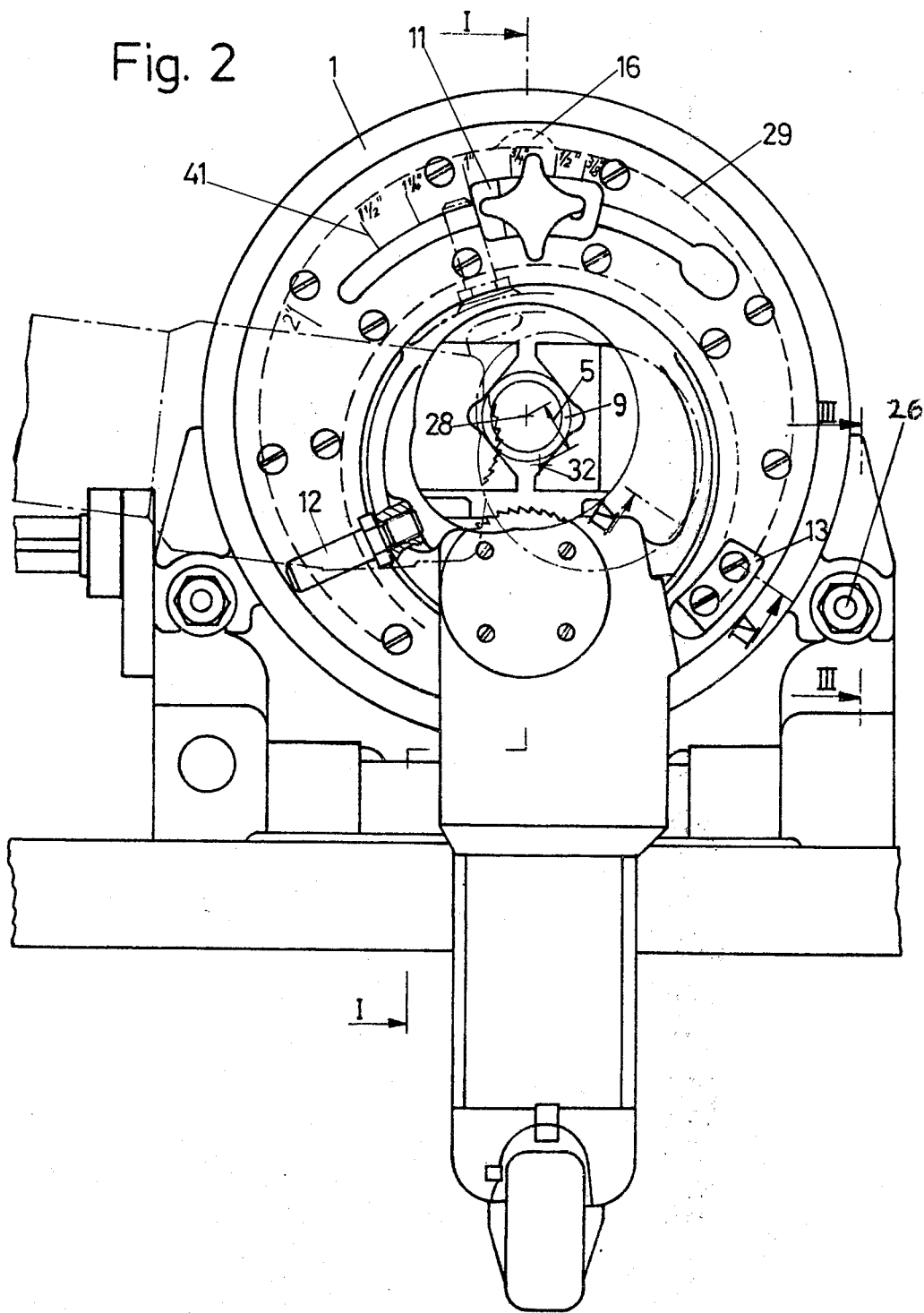
FIG. 2 is a view taken in the direction of the arrow A in FIG. 1.
Figure 3:
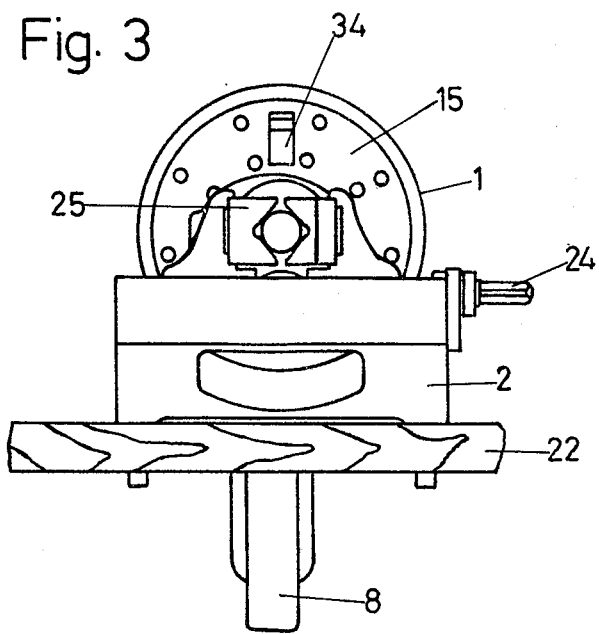
FIG. 3 is a view, on a reduced scale, taken in the direction of the arrow B in FIG. 1.
Figure 4:
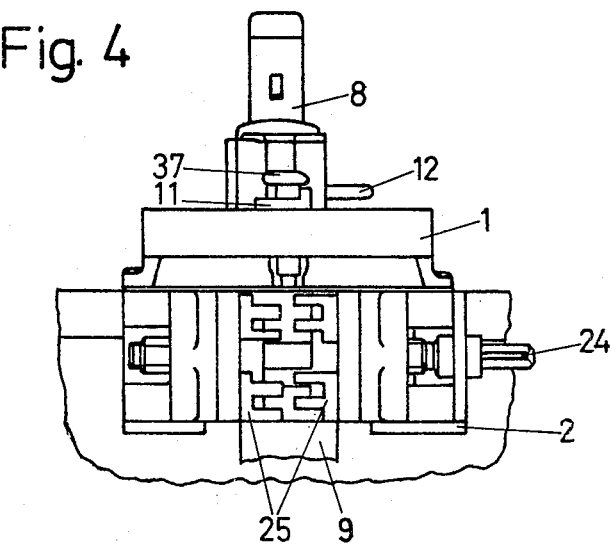
FIG. 4 is a top view of the cutting device as shown in FIG. 1.

As shown in FIG. 1, a bore 29 in the housing 1 is concentric with the workpiece axis 28. A ring 3 is rotatably mounted within the bearing housing 1 and is guided in the axial direction by means of spaced parallel ring disks 14, 15 each bearing on one of the two end faces of the ring. In addition, the ring disks 14, 15 also bear on guide surfaces 30, 30', respectively, on the bearing housing. While the outer surface of the ring is concentric to the workpiece axis 28, the surface of the inner bore 4 of the ring is eccentric to the workpiece axis and its amount of eccentricity 5, note FIG. 2, is selected in accordance with the maximum adjustment path of a cutting tool 7 relative to the workpiece 9. The maximum adjustment path also includes the extent of penetration of the cutting tool into the workpiece.

The ring disks 14, 15 located on the opposite sides of the ring 3 have a larger outside and smaller inside diameter as compared to the ring and are detachably connected to it by means of screws 31.

Figure 5:
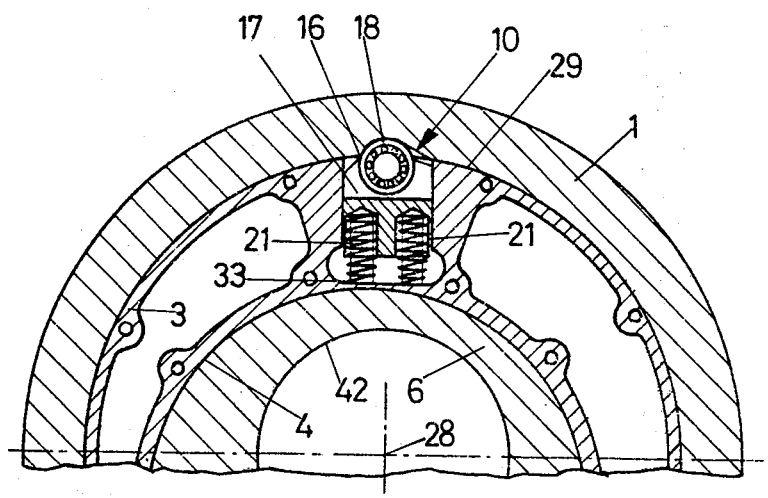
FIG. 5 is a cross-sectional view taken along the line II—II in FIG. 1.

On the surface of bore 29 in the interior of the bearing housing 1, a locking groove 16 is provided into which a slide 17, extending radially outwardly from the ring 3, seats so that a lock 10 is established between the bearing housing and the ring. As its end within the locking groove 16, the slide 17 is preferably equipped with a roller 18, for example, a ball bearing, and the opposite or radially inner end of the slide is provided with compression springs 21 which bear against the radially inner end face 33 of the guide in the ring 3 which supports the slide. The springs hold or bias the slide 17 in the locking position, note FIG. 5. Other types of locks, for instance a ball lock, can also be used. The lock 10 defines the rest position of ring 3 and, at the same time, fixes the position of the eccentric center 32 of the bore 4 relative to the workpiece axis 28.

For the manual operation of the slide 17, a release lever 34 extends through the ring disk 15 from the exterior of the bearing housing, note FIG. 1, and is connected to the slide by means of screws 35.

On the opposite side of the bearing housing from the release lever 34, the ring 3 is provided with a arcuate groove 19 and the ring disk 14 contains an arcuate slot 20 in register with the groove and a clamping screw 36 extends from the exterior of the ring disk 14 through the slot into the groove and forms, together with a knurled nut 37 screwed onto the clamping screw, a clamping device for securing a stop 11 positioned between the knurled nut and the ring disk. By means of the clamping device 36,37, the stop 11 can be adjustably moved along the slot 20 and a scale 41 is provided on the outer surface of the ring disk and indicates the different dimensional designations or diameter range of workpieces which can be cut by the device. The slot 20 can also be provided with locks for the clamping screw 26 or the stop 11 corresponding to the individual dimensions indicated on the scale.

Rotatably mounted in bore 4 is a cutting support 6 which has a bore or opening 42 extending laterally about and spaced outwardly from the workpiece 9. The cutting support 6 is guided in the axial direction between the ring disks 14, 15. A driving motor 8 is flanged on the cutting support 6 and transmits driving motion to a tool spindle 38 which drives a circular saw blade 7 mounted on the spindle. The saw blade 7 serves as the cutting tool for dividing the workpiece into individual sections.

Figure 7:
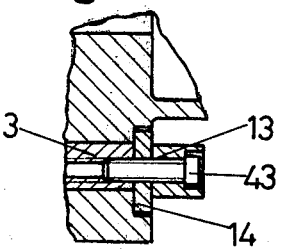
FIG. 7 is a partial sectional view taken along the line IV—IV in FIG. 2.

As can be seen in FIG. 2, a driving pin 12 is secured to the cutting support 6 and extends outwardly beyond the bore 4. In FIG. 2 the driving pin 12 is shown in full lines in the rest position of the cutting support 6, that is, the position in which the blade 7 mounted on the cutting support is spaced the maximum adjusted distance from the surface of the workpiece located on the axis of the bearing housing 1. By rotating the cutting support 6 about the eccentric axis 32 of bore 4, the stop 12 is moved about the workpiece or bearing housing axis 28 into contact with the adjustable stop 11. The extent of the adjustment path of the cutting tool 7 also includes the extent of penetration of the tool into the workpiece 9. A stop 13 is provided in the path of the housing containing the driving motor 8 which limits the movement of such housing in the counterclockwise direction as viewed in FIG. 2. The stop 13 is connected by screws 43 to the ring 3, note FIG. 7. This fixed rest position of cutting support 6 also corresponds to its stable position.

In cutting the workpiece 9 held in the chuck housing 2, the stop 11 is positioned on the scale 41 to the dimension of the workpiece to be cut. Subsequently, the cutting support 6 is pivoted about the eccentric axis 32 and the cutting support along with the driving pin 12 is rotated into the position indicated in broken lines in FIG. 2 with the driving pin in contact with the stop 11. Due to the pivotal movement, the cutting blade 7 supported on the cutting support 6 is guided along an arcuate path of travel inwardly into contact with the workpiece 9 for subsequently cutting the workpiece. Since the driving pin 12 is in contact with the stop 11, the ring 3 mounted concentrically to the workpiece 9 is carried along by the further pivotal movement of the cutting support 6 with the combined rotational movement of the ring 3 and the cutting support 6 being guided about the axis 28 of the workpiece with the cutting tool held in engaging position until a section of the workpiece is separated after one revolution of the ring 3. In carrying out the cutting operation, the lock 10 between the ring 3 and the bearing housing 1 is released by the lever 34.

Following the separating process, the cutting tool 7 is returned by an opposite pivotal movement of the cutting support 6 until the cutting support contacts the stop 13 and the ring 3 is returned into its locked position with the cutting support also being brought into its rest position so that a subsequent cutting operation can be performed.

While the workpiece has been referred to as a pipe or tubular member it can be appreciated that the invention would also be applicable to other types of workpieces which are adaptable to the chuck housing 2 and are to be cut into sections.

While a specific embodiment of the invention has been shown and described in detail to illustrate the application of the inventive principles, it will be understood that the invention may be embodied otherwise without departing from such principles.

I claim:

1. A pipe cutter for cutting workpieces having a range of diametrical sizes comprising a stationary chuck having a central axis and arranged to hold a workpiece to be cut concentric with the central axis, a bearing housing having a central axis disposed in axial alignment with the central axis of said chuck so that the workpiece extends along the central axis of said bearing housing, a rotor concentrically mounted in said bearing housing, a cutting support mounted in said rotor for pivotal movement, a motor driven cutting tool supported on said cutting support for movement therewith relative to a workpiece, wherein the improvement comprises a first bore concentrically formed in said bearing housing, said rotor comprises a ring rotatably mounted in said first bore in said bearing housing with its outer circumferential surface concentric to the central axis of said bearing housing, said ring having a second bore therein located eccentrically to the central axis of said bearing housing, said cutting support being pivotally positionable with respect to said ring within the second bore in said ring to thereby move the cutting support eccentrically to the workpiece into position for effecting the cutting operation, and rotatable with said ring within the bearing housing, said cutting support having an opening therethrough extending around the central axis of said bearing housing and the surface forming the opening spaced radially outwardly from the maximum diametrical sized workpiece positionable within said bearing housing, said cutting tool being mounted on said cutting support so that it pivots with said cutting support between a rest position spaced the maximum pivoted distance from the workpiece and a second position in contact with the workpiece to be cut, means for releasably locking said ring to said bearing housing between said rest and second positions of said cutting support, a first stop attached to said ring and defining the rest position of said cutting support relative to said ring, a second stop movably positionably attached to said ring in accordance with the diametrical size of the workpiece to be cut, a driving pin positioned in said cutting support and arranged to contact said second stop when said cutting tool on said cutting support is in position in contact with a workpiece and to rotate said ring concentrically together with said cutting support about the workpiece when said cutting support is rotated within the bearing housing about the workpiece.

2. A pipe cutter, as set forth in claim 1, wherein a pair of ring disks are positioned within said bearing housing in axially spaced relationship with said ring disposed between and in contact with said ring disks, said ring disks having a larger outside diameter than said ring and a smaller inside diameter than said ring.

3. A pipe cutter, as set forth in claim 1, wherein said means for locking said ring comprises a locking groove formed in the inwardly facing surface of said bearing housing, a slide mounted in the outwardly facing surface of said ring and said slide being spring-biased into contact with the locking groove in said bearing housing.

4. A pipe cutter, as set forth in claim 3, wherein a roller is mounted in the radially outer end of said slide and is arranged to seat within said groove in said bearing housing when said ring is in the locked position within said bearing housing.

5. A pipe cutter, as set forth in claim 3, wherein a release lever is attached to said slide for releasing the lock between said ring and said bearing housing.

6. A pipe cutter, as set forth in claim 2, wherein said ring has a groove in the surface thereof extending transversely of the axial direction of said ring and said groove extends in the circumferential direction of said ring, a slot formed in the surface of said ring disk juxtaposed to the surface of said ring containing said groove, said slot arranged in register with said groove, and said second stop being movably positionable through said groove and slot.

7. A pipe cutter, as set forth in claim 6, wherein said ring disk containing said slot having a scale along said slot for indicating the range of the dimensional size of the workpieces to be cut by the pipe cutter.

8. A pipe cutter, as set forth in claim 7, including means for clamping said stop to said ring and said ring disk in which said slot is formed.

9. A pipe cutter, as set forth in claim 1, including means for detachably connecting said chuck to said bearing housing.

* * * * *

UNITED STATES PATENT OFFICE
CERTIFICATE OF CORRECTION

Patent No. 3974562            Dated August 17, 1976

Inventor(s) Xaver Wuchner

It is certified that error appears in the above-identified patent and that said Letters Patent are hereby corrected as shown below:

In the heading of the Patent [75] should read as follows:

--[75] Xaver Wuchner--.

Signed and Sealed this

Twenty-sixth Day of October 1976

{SEAL}

Attest:

RUTH C. MASON
*Attesting Officer*

C. MARSHALL DANN
*Commissioner of Patents and Trademarks*